(12) United States Patent
Ciano et al.

(10) Patent No.: US 10,237,740 B2
(45) Date of Patent: Mar. 19, 2019

(54) SMART MANAGEMENT OF MOBILE APPLICATIONS BASED ON VISUAL RECOGNITION

(71) Applicant: International Business Machines Corporation, Armonk, NY (US)

(72) Inventors: Giuseppe Ciano, Rome (IT); Francesca Curzi, Rome (IT); Marco De Santis, Rome (IT)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/336,486

(22) Filed: Oct. 27, 2016

(65) Prior Publication Data

US 2018/0124609 A1    May 3, 2018

(51) Int. Cl.
| | |
|---|---|
| H04M 1/66 | (2006.01) |
| H04W 12/08 | (2009.01) |
| H04W 4/02 | (2018.01) |
| H04W 68/00 | (2009.01) |
| H04L 12/58 | (2006.01) |
| G06K 9/00 | (2006.01) |

(52) U.S. Cl.
CPC ............ *H04W 12/08* (2013.01); *H04W 4/02* (2013.01); *H04W 68/00* (2013.01); *G06K 9/00288* (2013.01); *H04L 51/32* (2013.01)

(58) Field of Classification Search
None
See application file for complete search history.

(56) References Cited

U.S. PATENT DOCUMENTS

| | | |
|---|---|---|
| 7,734,072 B2 | 6/2010 | Yamaguchi |
| 8,218,080 B2 | 7/2012 | Xu et al. |
| 8,261,090 B1 | 9/2012 | Matsuoka |
| 8,427,476 B2 | 4/2013 | Chen et al. |
| 8,601,573 B2 | 12/2013 | Nelson et al. |
| 8,725,113 B2 | 5/2014 | Gargi et al. |
| 8,994,499 B2 | 3/2015 | Zhao et al. |
| 9,582,851 B2 | 2/2017 | Raman |
| 10,019,055 B2 | 7/2018 | Miller |
| 10,055,567 B2 | 8/2018 | Ulrich et al. |

(Continued)

FOREIGN PATENT DOCUMENTS

WO    2012044515 A2    4/2012

OTHER PUBLICATIONS

© Cycling'74: Tools for Sound, Graphics, and Interactivity, "Topic: face detection as a trigger", retrieved Oct. 19, 2016, 15 pages. <https://cycling74.com/forums/topic/face-detection-as-a-trigger/>.

(Continued)

*Primary Examiner* — Suhail Khan
(74) *Attorney, Agent, or Firm* — Patterson + Sheridan, LLP

(57) ABSTRACT

Systems, methods, and computer program products to perform an operation comprising executing a first application on a mobile device, identifying a first user in proximity to the mobile device based on a predefined proximity criterion, and responsive to identifying the first person in proximity to the mobile device, identifying, in a registry, a first action defined on the basis of a predefined association between the first application and the first user, and performing the first action to modify at least one of the mobile device and the first application.

17 Claims, 7 Drawing Sheets

(56) References Cited

U.S. PATENT DOCUMENTS

| | | |
|---|---|---|
| 2006/0192775 A1 | 8/2006 | Nicholson et al. |
| 2007/0254631 A1* | 11/2007 | Spooner .............. G06F 21/6218 |
| | | 455/411 |
| 2012/0235790 A1* | 9/2012 | Zhao ....................... G06F 21/32 |
| | | 340/5.83 |
| 2015/0249718 A1 | 9/2015 | Huybregts et al. |
| 2015/0355915 A1 | 12/2015 | Sipe et al. |

OTHER PUBLICATIONS

Rubino, D., "How to use multiple accounts with Windows Hello in Windows 10", Nov. 3, 2015, 8 pages. <http://www.windowscentral.com/use-multiple-accounts-windows-hello-win10>.

Rubino, D., "Building biometric authentication into your Windows 10 app is easy with Windows Hello", Jan. 26, 2016, 12 pages. <http://www.windowscentral.com/microsoft-details-how-developers-can-easily-use-windows-hello>.

Khan, S., "Visidon AppLock For Android Uses Face Recognition To Unlock Protected Apps", Jul. 20, 2011, 4 pages. <http://www.addictivetips.com/mobile/visidon-applock-for-android-uses-face-recognition-to-unlock-protected-apps/>.

Indrawan, P., et al., "Face Recognition for Social Media With Mobile Cloud Computing", International Journal of Cloud Computing: Services and Architecture (IJCCSA), vol. 3, No. 1, Feb. 2013, 13 pages. <http://airccse.org/journal/ijccsa/papers/3113ijccsa02.pdf>.

\* cited by examiner

SMART MANAGEMENT OF MOBILE APPLICATIONS BASED ON VISUAL RECOGNITION

BACKGROUND

The present invention relates to mobile applications, and more specifically, to providing smart management of mobile applications based on visual recognition.

Mobile computing devices such as laptops, tablets, and smartphones have become integrated with cloud-based applications and social media applications, adding to the ever-increasing complexity of such devices. Mobile computing devices use these applications to communicate with other users, devices, and platforms, and to generally share information. However, considering the rich data that has become available, these devices have not fully leveraged all possible capabilities and functionalities.

SUMMARY

In one embodiment, a method comprises executing a first application on a mobile device, identifying a first user in proximity to the mobile device based on a predefined proximity criterion, and responsive to identifying the first person in proximity to the mobile device, identifying, in a registry, a first action defined on the basis of a predefined association between the first application and the first user, and performing the first action to modify at least one of the mobile device and the first application.

In another embodiment, a system comprises a processor and a memory storing instructions, which when executed by the processor, performs an operation comprising executing a first application on a mobile device, identifying a first user in proximity to the mobile device based on a predefined proximity criterion, and responsive to identifying the first person in proximity to the mobile device, identifying, in a registry, a first action defined on the basis of a predefined association between the first application and the first user, and performing the first action to modify at least one of the mobile device and the first application.

In another embodiment, a computer-readable storage medium has computer-readable program code embodied therewith, the computer-readable program code executable by a processor to perform an operation comprising executing a first application on a mobile device, identifying a first user in proximity to the mobile device based on a predefined proximity criterion, and responsive to identifying the first person in proximity to the mobile device, identifying, in a registry, a first action defined on the basis of a predefined association between the first application and the first user, and performing the first action to modify at least one of the mobile device and the first application.

DETAILED DESCRIPTION

Embodiments disclosed herein leverage computer vision technologies to perform configurable application and/or mobile device actions in an automatic way. For example, a first user may have a chat application open on a mobile device, where the first user chats with a second user via the chat application. A rule may specify that if another user (i.e., a person other than the first or second user) is determined to be in proximity of the mobile device (e.g., holds the mobile device, is within a predefined distance of the mobile device, or is in the field of view of a camera of the mobile device), the chat application should be minimized and the mobile device should be locked to enhance privacy and/or security of the chat application and/or the mobile device. When a third user is then detected in image data captured by the camera of the mobile device (e.g., the first user passes the mobile device to the third user), the chat application is minimized and the mobile device is locked responsive to detecting the third user based on the existing rule. In other embodiments, however, the rule may be dynamically modified based on one or more of the third user, a relationship between the first and third users, the second and third users, the content and/or context of the chat between the first and second users, a location where the mobile device is located, and the like. For example, the mobile device may determine that the third user is defined as a favorite contact in the first user's contacts, and that the first, second, and third users are all connected on multiple social media platforms. In such an example, the mobile device may modify the rule and/or the action associated with the rule. For example, the mobile device may refrain from locking the mobile device and/or minimizing the chat application. However, if the mobile device determines that the first and second user are discussing a surprise birthday party for the third user in the chat application, the mobile device may obscure the text in the chat application regarding the birthday party, while keeping the chat application open and the device unlocked.

Figure 1:
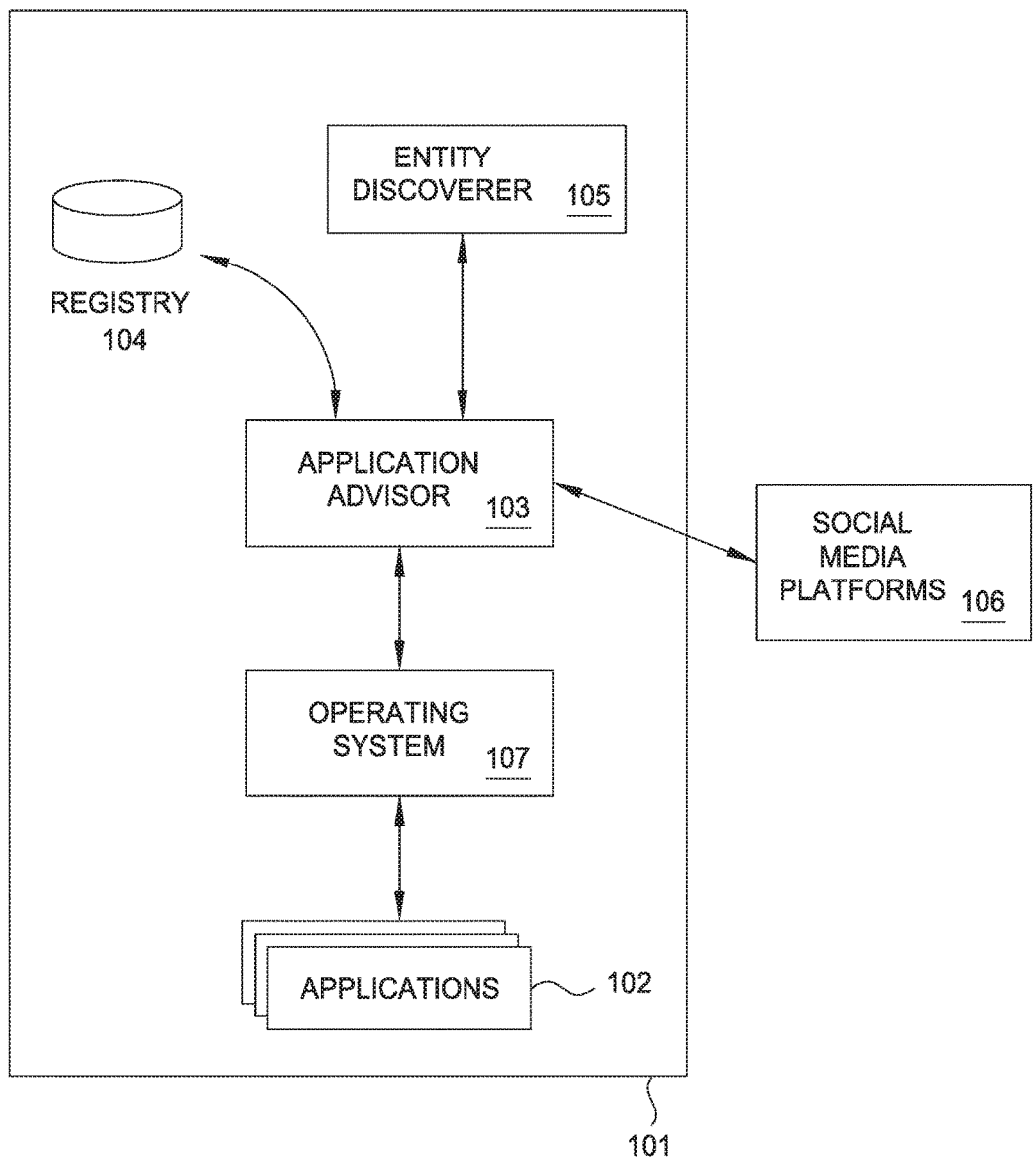
FIG. 1 illustrates an example system architecture which provides smart management of mobile applications based on visual recognition, according to one embodiment.

FIG. 1 illustrates an example system 100 which provides smart management of mobile applications based on visual recognition, according to one embodiment. As shown, the system 100 includes a mobile device 101. The mobile device 101 may be any type of computing device, such as a laptop computer, smartphone, tablet, portable gaming device, and the like. The mobile device 101 includes a plurality of applications 102, an application advisor 103, a registry 104, an entity discoverer 105, and an operating system 107. The applications 102 are representative of any type of application that can be executed by the mobile device 101. The operating system 107 is software which controls the hardware and software resources of the computing device 101 and provides common services for the applications 102.

The registry 104 is a data store which holds information regarding the applications 102, a plurality of users, associations between users and applications, rules related to applications and users, and predefined actions that can be performed when a user is identified by the entity discoverer 105. For example, the registry 104 may include a status of the user (e.g., owner of the device 101), images of each user, user preferences, preferred actions (e.g., to lock the mobile device when another user is detected rather than close the currently displayed application), preferred applications 102, and the like. Information stored in the registry 104 describing the associations between users and applications 102 may specify account information for users of the applications 102, user preferences for the applications 102, and the like. The rules in the registry 104 specify conditions which, when met, trigger an associated action. The rules stored in the registry 104 may include default rules, as well as templates that allow users to customize rules.

For example, a user profile in the registry 104 may include one or more images of a particular user called User X. The entity discoverer 105 is configured to perform facial recognition on an image captured by the computing device 101 to determine whether User X is holding the device. A first rule in a user profile in the registry 104 may specify that when User X is detected in proximity of the mobile device 101 (such as when User X is holding the device), a web browser is opened and User X's favorite web page is loaded. The user profile may also specify connections between User X and other users (e.g. contacts, social media connections, and the like). If the entity discoverer 105 identifies users having defined connections with user X in the user profile, the application advisor 103 may perform operations on the device 101 accordingly. The user profile may further include rules defined by User X relative to one or more applications, such as a rule that restricts any other users from viewing a particular application, or a rule that permits all users to view a particular application.

The entity discoverer 105 is a module which identifies users in proximity of the mobile device 101. In at least one embodiment, the entity discoverer 105 leverages computer vision technology to identify a user in an image captured by a camera (not pictured) of the computing device 101. However, in other embodiments, the entity discoverer 105 may use voice recognition, fingerprint scanning, iris scanning, or other biometric identifiers to identify one or more users in proximity of the mobile device 101. User identification may be triggered by some predefined event. For example, the entity discoverer 105 may use data provided by an accelerometer to determine that the mobile device 101 has been passed from one user to another (or otherwise has been moved). Upon detecting such movement, the entity discoverer 105 may perform facial recognition, voice recognition, etc., to determine who is now holding the mobile device 101. As an alternative to event-driven user detection, the entity discoverer 105 may periodically initiate user identification according to a predefined timing schedule.

In those embodiments where the sensors are located on the mobile device, the location of the identified persons relative to the mobile device can be ascertained within some degree of accuracy. For example, biometric sensors such as fingerprint scanners or iris scanners require the person to be in contact with or very close to the sensor. Acoustic sensors are capable of estimating a distance of the person relative to the sensor based on known algorithms. In the case of image capturing devices, image processing can be done to determine the location of the person within the captured image. In other embodiments, having identified a particular person by one means (e.g., voice recognition), the mobile device 101 may resort to an alternative means for determining the relative proximity of the particular person to the mobile device 101. For example, the mobile device 101 may lookup (e.g., in the registry 104) a respective mobile device associated with (e.g., owned by) the identified person. The mobile device 101 may then attempt a peer-to-peer connection with the respective mobile device of the identified person. If the connection is successful, and if permission has been granted by the identified person, the mobile device 101 may request and receive the location of the mobile device of the identified person (e.g., GPS coordinates). On the assumption that the identified person is carrying the respective mobile device, the mobile device 101 has now determined the location of the identified person. The mobile device 101 may then apply any of a variety of rules for determining whether the identified person is within a predefined proximity of the mobile device. In at least one embodiment, the entity discoverer 105 applies a maximum distance threshold for determining whether a person is in proximity of the mobile device 101. For example, if the maximum distance threshold is 3 meters, and the entity discoverer 105 determines that users A and B are 2 and 5 meters away from the mobile device 101, respectively, the entity discoverer may determine that user A, and not user B, is in proximity of the mobile device 101.

The application advisor 103 is a module that leverages information provided by the entity discoverer 105 and the registry 104 to perform actions on the mobile device 101. For example, if the entity discoverer 105 returns an indication that user X is holding the mobile device 101, the application advisor 103 references the registry 104 for associated applications, rules, and actions. In response, the registry 104 may return the rule specifying to open the web browser, and load user X's favorite web page. In at least one embodiment, the application advisor 103 performs the returned operation (e.g., opening the web browser and loading the web page). In one embodiment, the application advisor 103 prompts the user for approval prior to performing the predefined operation.

In at least one embodiment, the application advisor 103 may dynamically modify the operation. For example, user X's preferred web page may include user X's personal financial information. Furthermore, the entity discoverer 105 may have returned an indication that user Y is also in proximity of the mobile device 101, as the entity discoverer 105 identified user Y's face in image data captured by the mobile device 101. As such, the application advisor 103 may reference the repository 104 and/or the social media platforms 106 to determine whether associations between user X and user Y exist. For example, a contact record in the registry 104 may specify that user X and user Y are friends. As another example, the application advisor 103 may identify a message posted on one of the social media platforms 106 by user X indicating that user Y is a close friend of user X. Based on an analysis of the message and the contact information, the application advisor 103 may identify a relationship between the users, and not modify the user X's personal financial information when the web page is loaded. However, if the application advisor 103 determines that user X does not have user Y as a personal contact in the registry 104, and the social media platforms 106 do not reflect a connection or relationship between users X and Y, the application advisor 103 may modify the operation returned by the registry 104 to protect user X's personal financial information. For example, the application advisor 103 may obscure the financial information, refrain from loading the preferred web page which includes the financial information, refrain from opening the web browser, open a different application 102, and/or loading a different web page in the web browser.

Therefore, in at least one embodiment, the application advisor 103 determines a context for the mobile device 101 based on one or more of the user(s) in proximity of the mobile device 101, a location of the mobile device 101 (e.g., a user's home, a public space, etc.), the applications 102 currently executing on the mobile device 101, a content displayed by the applications 102 on the mobile device 101 (e.g., whether private, confidential, or otherwise important information), relationships between the user(s) in proximity of the mobile device 101. Once the application advisor 103 determines the context, the application advisor 103 may dynamically modify the operations stored in the registry 104 based on the context. Doing so improves performance and security of the mobile device 101 by providing dynamic, tailored controls over the mobile device 101 based on the context.

Figure 2A:
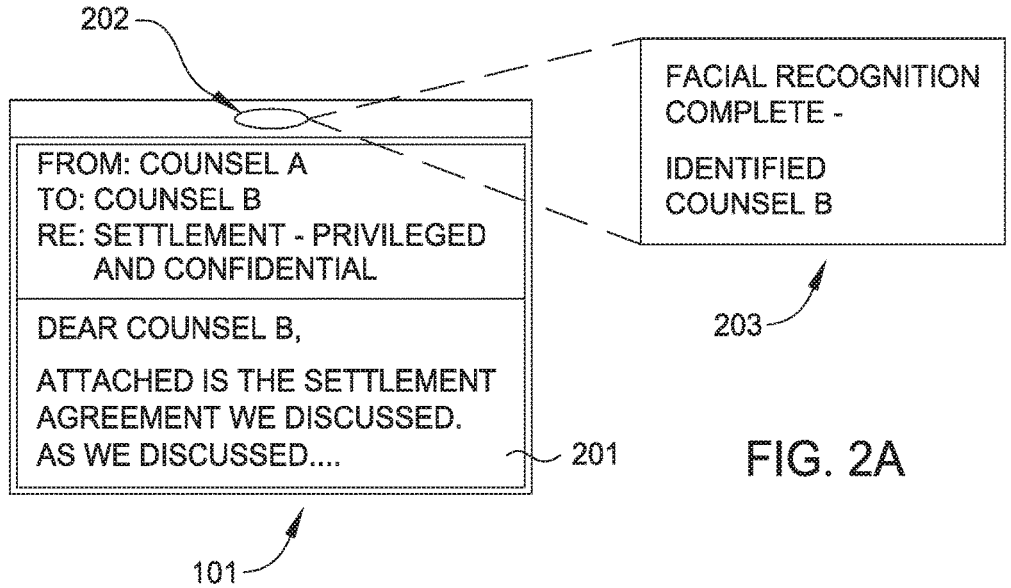
FIGS. 2A-2C illustrate examples of providing smart management of mobile applications based on visual recognition, according to various embodiments.

FIG. 2A illustrates an example of providing smart management of mobile applications based on visual recognition, according to various embodiments. As shown, FIG. 2A reflects a graphical user interface (GUI) outputted on a display device 201 of the mobile device 101, which in this example, displays an email in an email client. As shown, the mobile device 101 includes a camera 202. The entity discoverer 105 may process image data provided by the camera 202 using a facial recognition algorithm to identify a user that is in proximity of the mobile device. Specifically, as shown in block 203, the entity discoverer 105 has identified example user "Counsel B" in the image data provided by the camera 202. The application advisor 103 may then reference the registry 104 to determine that Counsel B is the owner of the mobile device 101 and has an email account registered with the email client. As such, the registry 104 may return an indication to not perform a predefined operation based on the current status of the device (e.g., Counsel B reading an email outputted on the display 201).

Figure 2B:
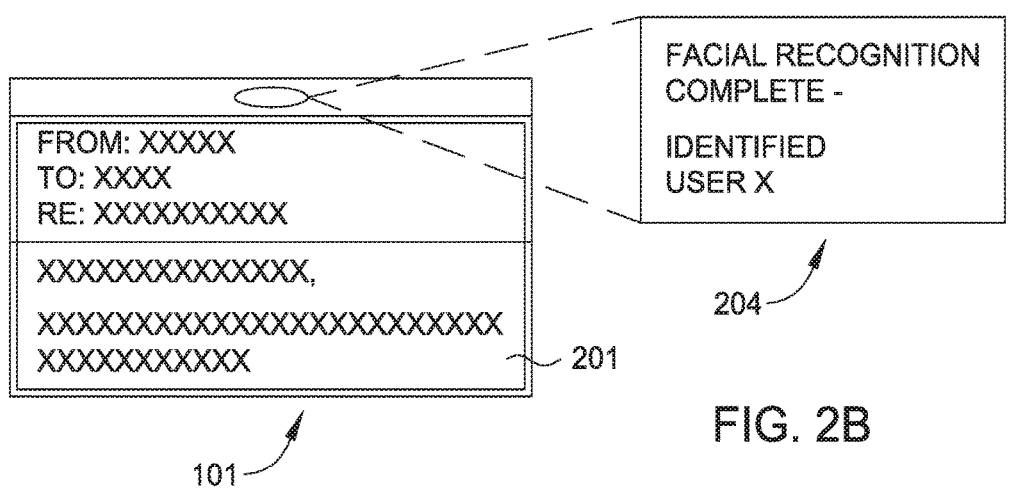

FIG. 2B reflects an embodiment where the entity discoverer 105 has identified User X via facial recognition of image data provided by the camera 202, as reflected in block 204. As such, the application advisor 103 may then reference the registry 104 using User X as the identified user and the email application as a currently executing application on the mobile device 101. The registry 104 may return a rule specifying that the application advisor 103 should obscure the text of the email in the GUI outputted on the display 201 at any time when Counsel B is not identified. As shown in FIG. 2B, therefore, the application advisor 103 has obscured the text of the email to protect the confidentiality of the email. In at least one embodiment, the application advisor 103 analyzes the text of the email to dynamically modify the rule returned by the registry 104. For example, if the rule specifies to minimize the email client, the application advisor 103 may modify the rule to obscure the text of the email, because user X could re-open the email application and view the email. Similarly, the application advisor 103 may reference the registry 104 to determine that User X is an attorney who works at the same law firm as Counsel B. In such an example, the application advisor 103 may refrain from obscuring the text of the email, as User X is permitted to view the email as a colleague of Counsel B.

Figure 2C:
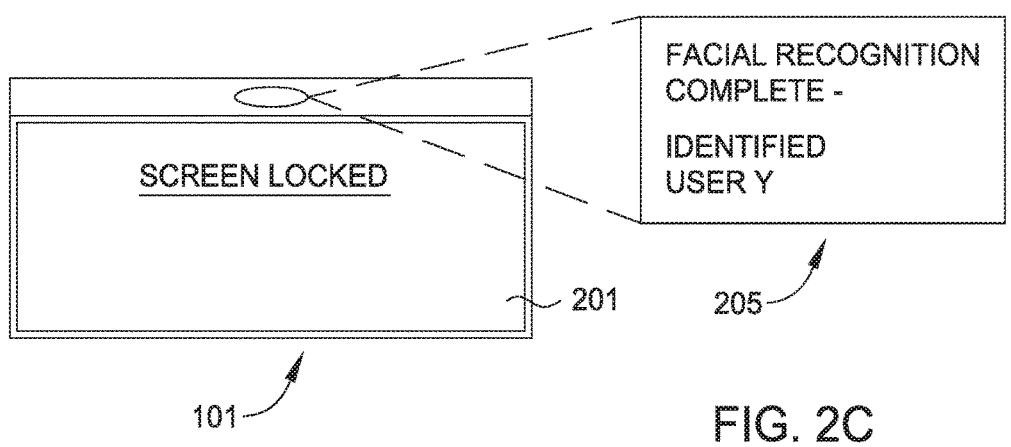

FIG. 2C illustrates an embodiment where the entity discoverer 105 has identified User Y via facial recognition of image data provided by the camera 202, as reflected in block 205. As such, the application advisor 103 may then reference the registry 104 using User Y as the identified user and the email application as a currently executing application on the mobile device 101. The registry 104 may return a rule specifying that the application advisor 103 should close the email application outputted on the display 201 when user Y is identified. As such, the application advisor 103 has removed the email application from the display 201. Furthermore, as shown, the application advisor 103 has locked the mobile device 101. For example, the application advisor 103 may reference the registry 104 and/or the social media platforms 106 to determine that User Y is not a personal contact of Counsel B. Furthermore, the social media platforms 106 may include posts by Counsel B indicating User Y left Counsel B's law firm. Based on this context, the application advisor 103 may determine to enhance Counsel B's security, and lock the mobile device 101.

Figure 3:
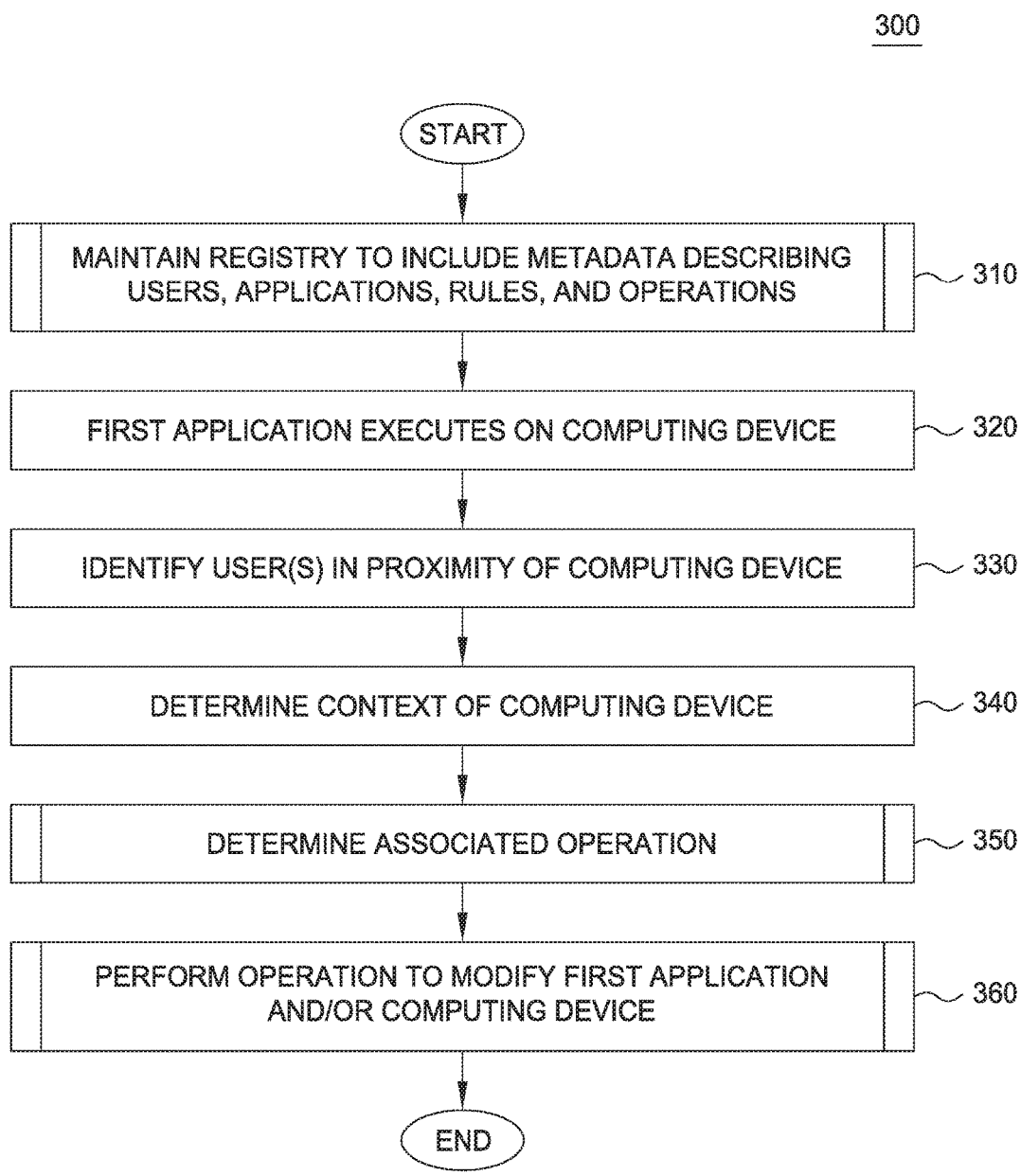
FIG. 3 is a flow chart illustrating an example method to provide smart management of mobile applications based on visual recognition, according to one embodiment.

FIG. 3 is a flow chart illustrating an example method 300 to provide smart management of mobile applications based on visual recognition, according to one embodiment. As shown, the method 300 begins at block 310, described in greater detail with reference to FIG. 4, where the registry 104 is maintained. Generally, the registry 104 is configured to store metadata describing users, applications, relationships between users and applications, rules associated with users and/or applications, and operations that are initiated by the application advisor 103 on a mobile device. For example, the registry 104 may reflect that users A and B are married. User A may also specify a rule in the registry 104 that allows user B to view the contents of a banking application 102. Similarly, user A may further define a rule that restricts user B from viewing the contents of user A's work email in an email application 102, and an operation that closes user A's work email application 102 when user B is detected in proximity of user A's mobile device 101.

At block 320, a first application 102 executes on the mobile device 101. For example, user A may execute the banking application 102. At block 330, the entity discoverer 105 identifies one or more users in proximity of the mobile device 101. For example, the entity discoverer 105 may identify user A, user B, and user C in image data captured by the camera 202 of the mobile device 101. In at least one embodiment, the entity discoverer 105 identifies the users by comparing faces depicted in the image data captured by the camera 202 to an image of each user stored in the registry 104 (and/or remote data sources, such as the social media platforms 106). Similarly, at block 330, the entity discoverer 105 may determine whether possession of the mobile device 101 switched between users, and then identify which user is currently in possession of the mobile device 101, as well as other users in proximity of the mobile device 101.

At block 340, the application advisor 103 may determine a context of the mobile device 101. The context may include the users identified at block 330, the application(s) executing (and/or displayed) on the mobile device 101, a location of the mobile device, and information stored in the registry 104. At block 350, described in greater detail with reference to FIG. 5, the application advisor 103 determines an operation to perform on the mobile device 101. In at least one embodiment, the operation is stored in the registry 104. However, the application advisor 103 may also generate the operation and/or dynamically modify the operations stored in the registry 104. For example, the registry 104 may include a rule associated with user A and/or the banking application 102 that specifies to permit users B and C to view the contents of the banking application 102 when accessed by user A. However, the application advisor 103 may modify the rule and/or associated action upon determining that the mobile device 101 is in a public location where other people are in proximity of the mobile device 101. As such, the application advisor 103 may restrict display of user A's banking information on the mobile device 101, thereby preventing other people from viewing the banking application 102 on the mobile device 101 in the public place. At block 360, described in greater detail with reference to FIG. 6, the application advisor 103 performs the operation determined at block 350 to modify the first application and/or the mobile device 101. For example the application advisor 103 may cause the first application to be closed and the device 101 locked.

Figure 4:
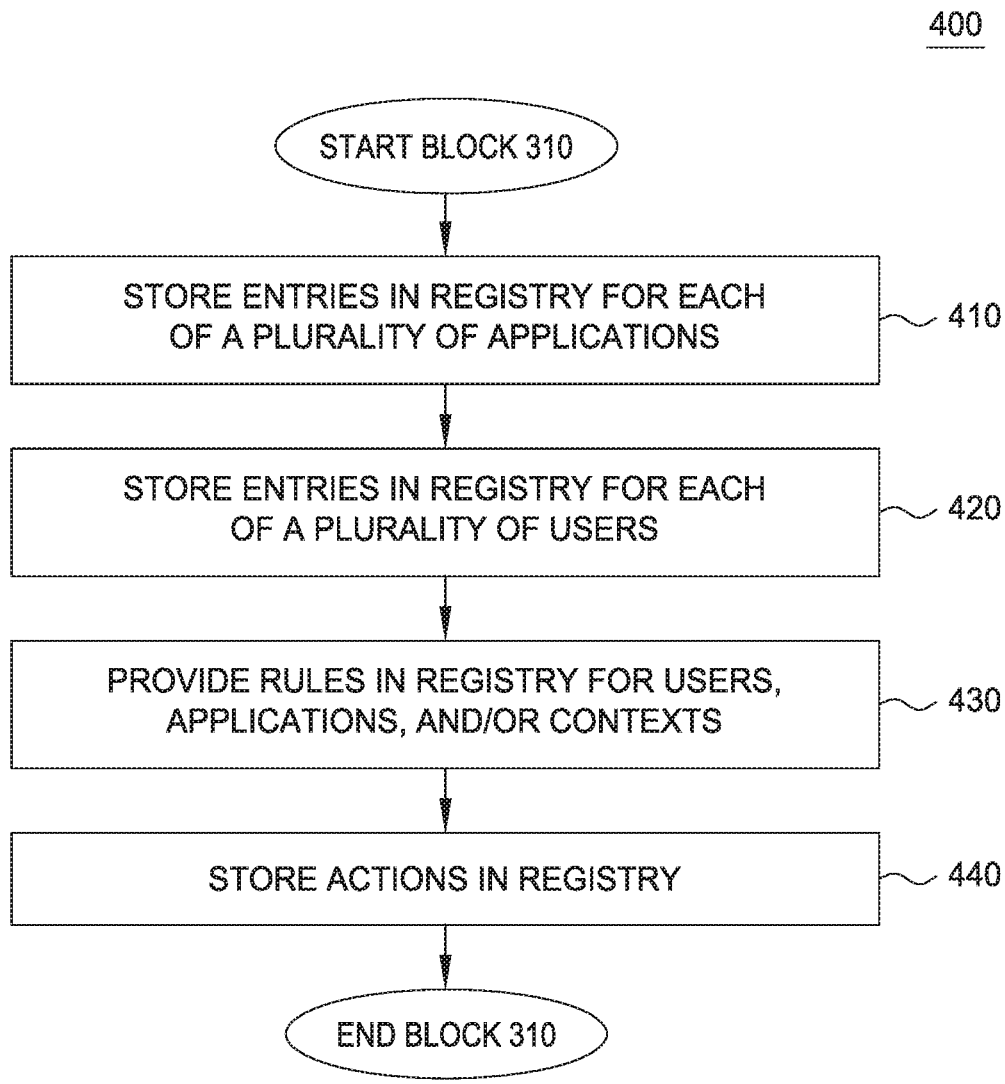
FIG. 4 is a flow chart illustrating an example method to maintain a registry, according to one embodiment.

FIG. 4 is a flow chart illustrating an example method 400 corresponding to block 310 to maintain a registry, according to one embodiment. As shown, the method 400 begins at block 410, where entries for each of a plurality of applications 102 are stored in the registry 104. The entries for each application 102 may include metadata describing each application, such as an application type, whether the application uses or exposes confidential or otherwise sensitive information, what credentials are required to access user accounts associated with the application, and the like. At block 420, entries for each of a plurality of users are stored in the registry 104. The entries for each user may include one or more images of the user, contacts of the user, links to social media profiles of the user, biographical information describing the user, and the like. The entries for the applications and users stored at blocks 410-420 may include entries that are defined by users as well as predefined entries. The predefined entries may be created by developers of an application 102 as well as system default entries for applications and/or users.

At block 430, rules are provided in the registry 104 for users, applications, and/or contexts of mobile devices. The rules may be defined by a user, application developer, and/or system default rules stored in the registry 104. For example, user X may specify a rule to lock the mobile device 101 any time a person other than user X is identified by the entity discoverer 105. As another example, a developer of an email application 102 may specify a default rule which closes opened emails and logs out of the current email account when a user other than the user associated with the account is identified by the entity discoverer 105. Furthermore, a system-default rule may specify to override user-defined rules when a context of the mobile device 101 reflects that the mobile device 101 is in a crowded area.

At block 440, one or more actions are stored in the registry 104. The actions may be user-defined or system default rules. The actions may be associated with users, applications, and/or contexts of the mobile device. For example, user A may specify an action that locks the mobile device 101 and sends an alert email to user A's email account when user B is detected in proximity of the mobile device 101 and user A is not detected in proximity of the mobile device 101. As another example, user B may specify to close an instant messaging application based on an analysis of the text in the instant messaging application. For example, if the application advisor 103 determines that user B is chatting with user C about user D, and user D is detected in proximity of the mobile device, then the application advisor 103 may close the instant messaging application or obscure text in the instant messing application.

Figure 5:
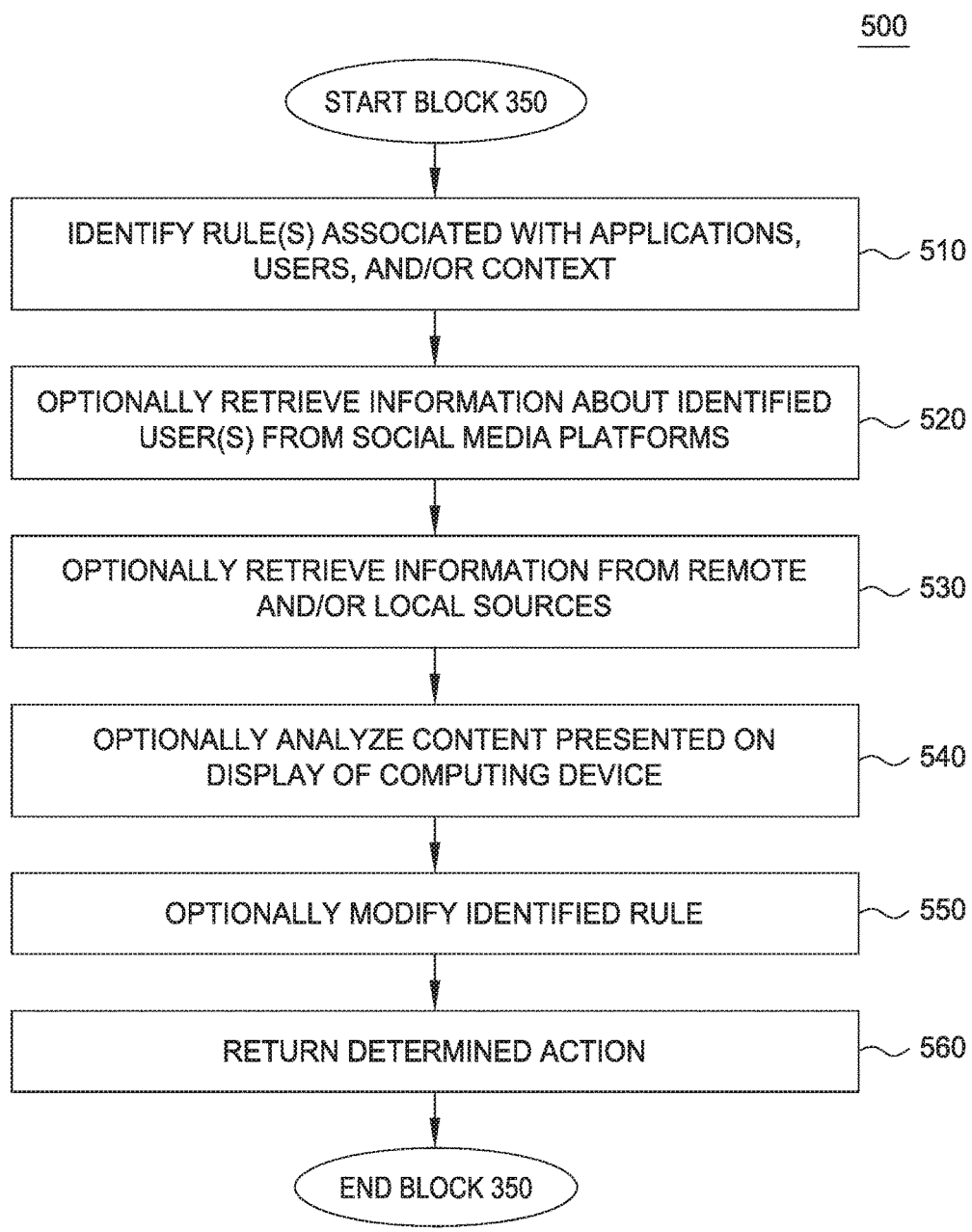
FIG. 5 is a flow chart illustrating an example method to determine an associated operation, according to one embodiment.

FIG. 5 is a flow chart illustrating an example method 500 corresponding to block 350 to determine an operation associated with a current context, according to one embodiment. As shown, the method 500 begins at block 510, where the application advisor 103 identifies one or more rules in the repository 104. The rules may be associated with one or more of the currently executing applications on the mobile device, the users identified in proximity of the mobile device, and/or the current context of the mobile device. For example, a default rule may specify to lock the mobile device 101 when a user other than the owner of the mobile device 101 is determined to be in proximity of the mobile device. At block 520, the application advisor 103 may optionally retrieve information about identified users in proximity of the mobile device from the social media platforms 106. For example, if the entity discoverer 105 identifies user Z in proximity of a mobile device 101, but user Z is not associated with the owner of the mobile device 101 (e.g., not listed as a contact), the application advisor 103 attempts to locate a profile for user Z on one or more social media platforms 106. Doing so allows the application advisor 103 to identify more information about user Z, including whether user Z is associated with the owner of the mobile device 101 on each social media platform.

At block 530, the application advisor 103 optionally retrieves additional information from the mobile device 101 and/or other remote data sources. For example, the application advisor 103 may reference emails and text messages stored on the mobile device 101 to determine whether any correspondence exists between the owner of the mobile device 101 and user Z. Similarly, the application advisor 103 may reference a cloud-based image hosting solution to determine whether user Z is depicted in any images uploaded by the owner of the mobile device 101. At block 540, the application advisor 103 optionally analyzes the content outputted on the display of the mobile device 101. For example, the application advisor 103 may identify people in images outputted on the display, analyze text outputted on the display, and the like.

At block 550, the application advisor 103 may optionally modify the rule identified at block 510. In at least one embodiment, the application advisor 103 modifies the rule based on one or more of blocks 520-540. For example, the application advisor 103 may determine that user Z is not listed as a contact on the mobile device 101, but is depicted in hundreds of images with the owner of the mobile device 101, and is associated with the owner of the mobile device 101 on social media platforms 106 (and in publications posted on the social media platforms 106). Furthermore, application advisor 103 may determine that a card game is being played on the mobile device 101, therefore, no sensitive information is outputted on the display of the mobile device 101. As such, the application advisor 103 may modify the rule specifying to lock the mobile device, and instead output a prompt asking the user to confirm whether the mobile device should be locked, as the application advisor 103 may have enough information to determine that user Z can be trusted by the owner of the mobile device 101.

Figure 6:
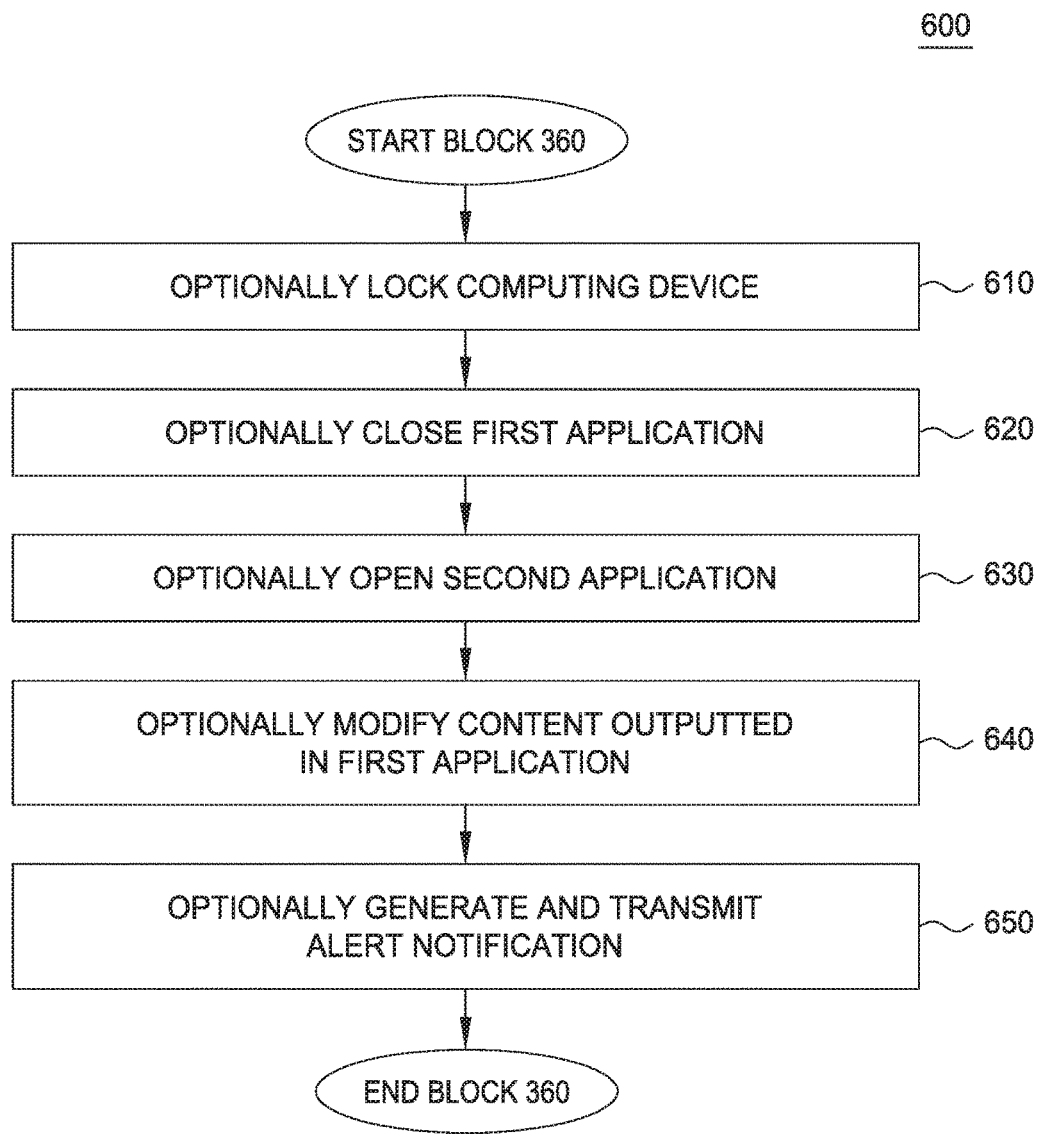
FIG. 6 is a flow chart illustrating an example method to perform an operation to modify an application and/or a computing device, according to one embodiment.

FIG. 6 is a flow chart illustrating an example method 600 corresponding to block 360 to perform an operation to modify an application and/or a computing device, according to one embodiment. Generally, the blocks of the method 600 correspond to one or more operations that are initiated by the application advisor 103 as described herein. As shown, the method 600 begins at block 610, where the application advisor 103 optionally determines to lock the mobile device 101. As such, the application advisor 103 initiates or performs a set of steps that lock the mobile device 101, such that only a user with proper credentials can subsequently unlock the mobile device 101. At block 620, the application advisor 103 optionally closes a first application 102 (e.g., the application currently outputted for display) on the mobile device 101. In at least one embodiment, the application advisor 103 may further lock the first application 102 such that a password or other identifier is required to re-access the first application 102.

At block 630, the application advisor 103 optionally determines to open a second application 102, different than the first application 102 that is currently outputted on the mobile device 101. At block 640, the application advisor 103 may optionally determine to modify the content outputted by the first application 102. For example, images outputted by the first application 102 may be modified, deleted, or replaced. As another example, text outputted by the first application 102 may be obscured or deleted. At block 650, the application advisor 103 may optionally generate and transmit an alert notification to an owner of the mobile device 101. The alert notification may include information about the location of the mobile device 101, any identified users in proximity of the mobile device, the current state of the mobile device 101, which applications are open on the mobile device 101, a screenshot of the display of the mobile device 101, and the like. The alert notification may be transmitted by any suitable medium, such as email, text messaging, social media messaging, and the like.

Figure 7:
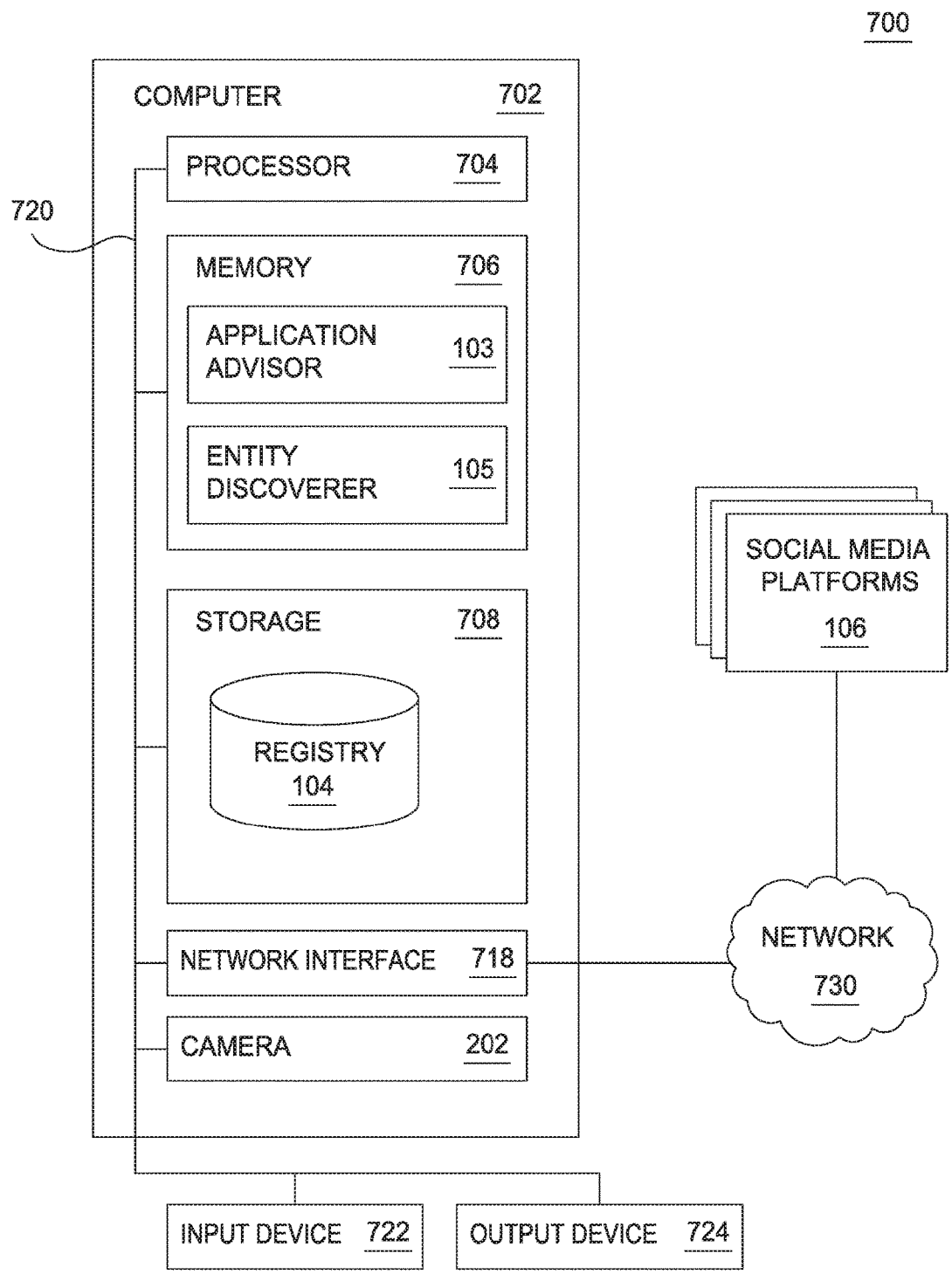
FIG. 7 illustrates an example system which provides smart management of mobile applications based on visual recognition, according to one embodiment.

FIG. 7 illustrates an example system 700 which provides smart management of mobile applications based on visual recognition, according to one embodiment. The networked system 700 includes a computer 702. The computer 702 may also be connected to other computers and services (e.g., the social media platforms 106) via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, cameras 202, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains the application advisor 103 and the entity discoverer 105. As shown, the storage 708 contains the registry 104. Generally, the system 700 is configured to implement all systems, methods, apparatuses, and functionality described herein with reference to FIGS. 1-6.

Advantageously, embodiments disclosed herein provide smart management of mobile devices and the applications executed thereon based on actions triggered automatically through recognition of users in proximity of the mobile devices. By recognizing users in proximity of a mobile device, embodiments disclosed herein may apply rules and associated actions to ensure that user applications and data are protected and secure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the application advisor 103 could execute on a computing system in the cloud. In such a case, the application advisor 104 may store registry data for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    executing a first application on a first mobile device;
    determining a current geographic location of the first mobile device;
    identifying a first user in proximity to the first mobile device based on a predefined proximity criterion, wherein the predefined proximity criterion comprises a predefined distance from the first mobile device;
    identifying a second user that is also in proximity of the first mobile device;
    determining that the first user is defined as an owner of the first mobile device and that the second user is not an authorized user of the first mobile device; and
    responsive to identifying the first user and the second user in proximity to the first mobile device:
        identifying, in a registry, a first action defined based on a predefined association between the first application, the first user, and the determined current geographic location of the first mobile device;
        modifying the first action based on the second user being in proximity of the first mobile device, wherein the modified first action comprises obscuring text displayed by the first application; and
        performing the modified first action to modify at least one of the first mobile device and the first application.

2. The method of claim 1, wherein identifying the first user comprises:
    capturing, by a camera of the first mobile device, image data depicting the first user;
    comparing the image data to an image of the first user stored in the registry; and
    determining that the first user is depicted in the image data captured by the camera.

3. The method of claim 1, wherein modifying the first action is based on: (i) determining that the first and second users are associated on a first social media platform, of a plurality of social media platforms, and (ii) analyzing a text of a social media post published by one of the first and second users on the first social media platform.

4. The method of claim 1, further comprising prior to performing the first action:
    determining a context of the first mobile device based at least in part on content displayed by the first application; and
    modifying the first action based on the determined context of the first mobile device.

5. The method of claim 1, wherein identifying the second user that is also in proximity to the first mobile device comprises:
    identifying a second mobile device associated with the second user;
    determining a location of the second mobile device; and
    determining that a distance between the first mobile device and the second mobile device is less than the predefined proximity criterion.

6. The method of claim 1, wherein the first action comprises one or more of: (i) locking the first mobile device, (ii) closing the first application, (iii) opening a second application on the first mobile device, (iv) modifying a content outputted by the first application on a display of the first mobile device, and (v) sending an alert notification to an owner of the first mobile device.

7. A computer program product, comprising:
    a computer-readable storage medium having computer readable program code embodied therewith, the computer readable program code executable by a processor to perform an operation comprising:
        executing a first application on a first mobile device;
        identifying a first user in proximity to the first mobile device based on a predefined proximity criterion, wherein the predefined proximity criterion comprises a predefined distance from the first mobile device;
        identifying a second user that is also in proximity of the first mobile device;
        determining that the user is defined as an owner of the first mobile device and that the second user is not an authorized user of the first mobile device; and
        responsive to identifying the first user and the second user in proximity to the first mobile device:
            determining a current geographic location of the first mobile device;
            identifying, in a registry, a first action defined based on a predefined association between the first application, the first user, and the determined current geographic location of the first mobile device;
            modifying the first action based on the second user being in proximity of the first mobile device, wherein the modified first action comprises obscuring text displayed by the first application; and
            performing the modified first action to modify at least one of the first mobile device and the first application.

8. The computer program product of claim 7, wherein identifying the first user comprises:
    capturing, by a camera of the first mobile device, image data depicting the first user;
    comparing the image data to an image of the first user stored in the registry; and
    determining that the first user is depicted in the image data captured by the camera.

9. The computer program product of claim 7, wherein modifying the first action is based on: (i) determining that the first and second users are associated on a first social media platform, of a plurality of social media platforms, and (ii) analyzing a text of a social media post published by one of the first and second users on the first social media platform.

10. The computer program product of claim 7, the operation further comprising prior to performing the first action:

determining a context of the first mobile device based at least in part on content displayed by the first application; and modifying the first action based on the determined context of the first mobile device.

11. The computer program product of claim 7, wherein identifying the second user that is also in proximity to the first mobile device comprises:

identifying a second mobile device associated with the second user;

determining a location of the second mobile device; and determining that a distance between the first mobile device and the second mobile device is less than the predefined proximity criterion.

12. The computer program product of claim 7, wherein the first action comprises one or more of: (i) locking the first mobile device, (ii) closing the first application, (iii) opening a second application on the first mobile device, (iv) modifying a content outputted by the first application on a display of the first mobile device, and (v) sending an alert notification to an owner of the first mobile device.

13. A system, comprising:

a processor; and a memory storing one or more instructions which, when executed by the processor, performs an operation comprising:

executing a first application on a first mobile device;

identifying a first user in proximity to the first mobile device based on a predefined proximity criterion, wherein the predefined proximity criterion comprises a predefined distance from the first mobile device;

identifying a second user that is also in proximity of the first mobile device;

determining that the first user is defined as an owner of the first mobile device and that the second user is not an authorized user of the first mobile device; and responsive to identifying the first user and the second user in proximity to the first mobile device:

determining a current geographic location of the first mobile device;

identifying, in a registry, a first action defined based on a predefined association between the first application, the first user, and the determined current geographic location of the first mobile device;

modifying the first action based on the second user being in proximity of the first mobile device, wherein the modified first action comprises obscuring text displayed by the first application; and performing the modified first action to modify at least one of the first mobile device and the first application.

14. The system of claim 13, wherein identifying the first user comprises:

capturing, by a camera of the first mobile device, image data depicting the first user;

comparing the image data to an image of the first user stored in the registry; and determining that the first user is depicted in the image data captured by the camera.

15. The system of claim 13, wherein modifying the first action is based on: (i) determining that the first and second users are associated on a first social media platform, of a plurality of social media platforms, and (ii) analyzing a text of a social media post published by one of the first and second users on the first social media platform.

16. The system of claim 13, the operation further comprising prior to performing the first action:

determining a context of the first mobile device based at least in part on content displayed by the first application; and modifying the first action based on the determined context of the first mobile device.

17. The system of claim 13, wherein identifying the second user that is also in proximity to the first mobile device comprises:

identifying a second mobile device associated with the second user;

determining a location of the second mobile device; and determining that a distance between the first mobile device and the second mobile device is less than the predefined proximity criterion.

* * * * *